Figures 5, 6:
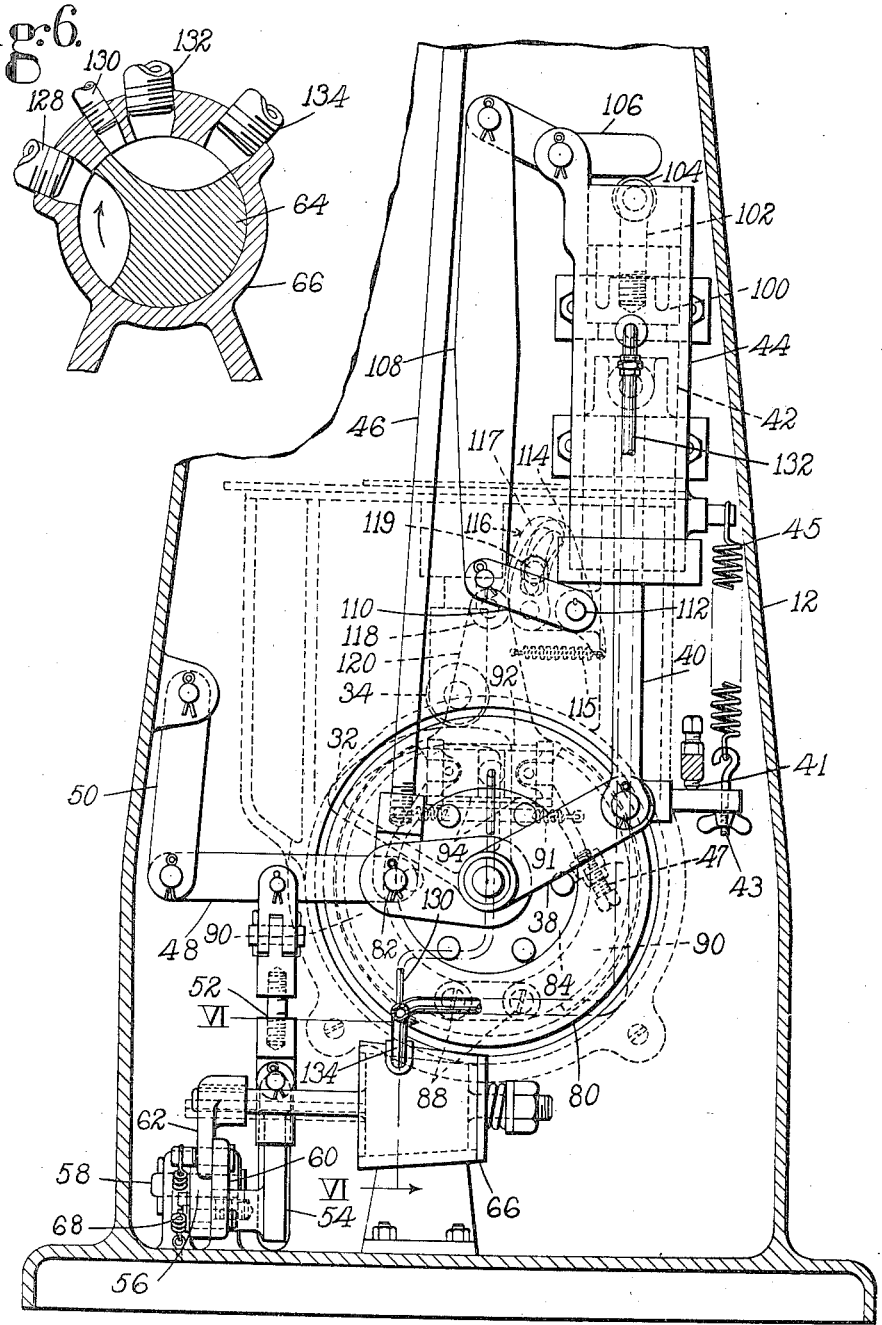

Jan. 2, 1940.  P. BRAUNER  2,185,426
FASTENING-INSERTING MACHINE
Filed Nov. 7, 1938  3 Sheets-Sheet 1
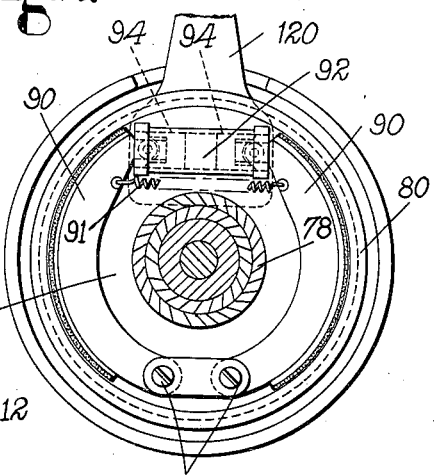
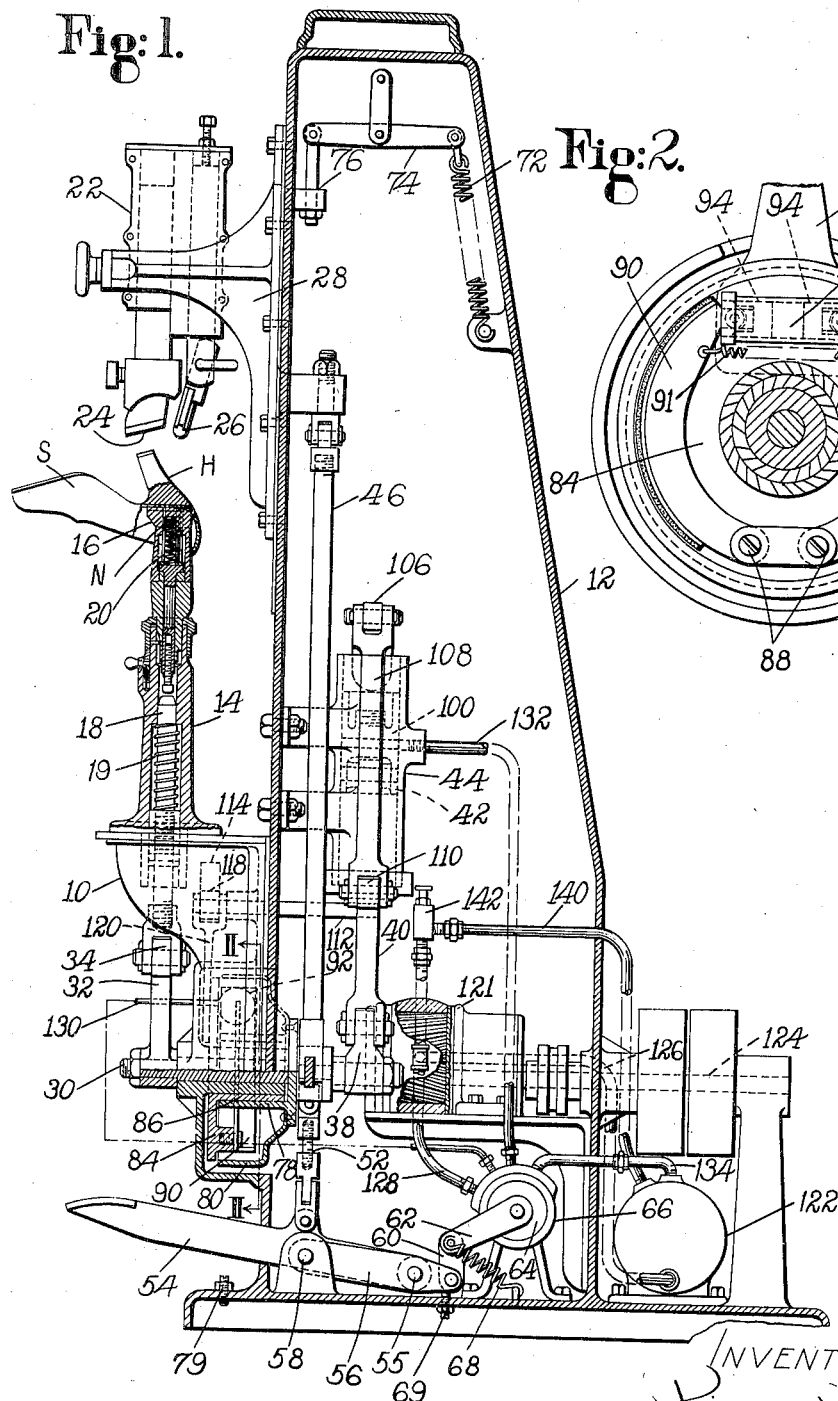
INVENTOR

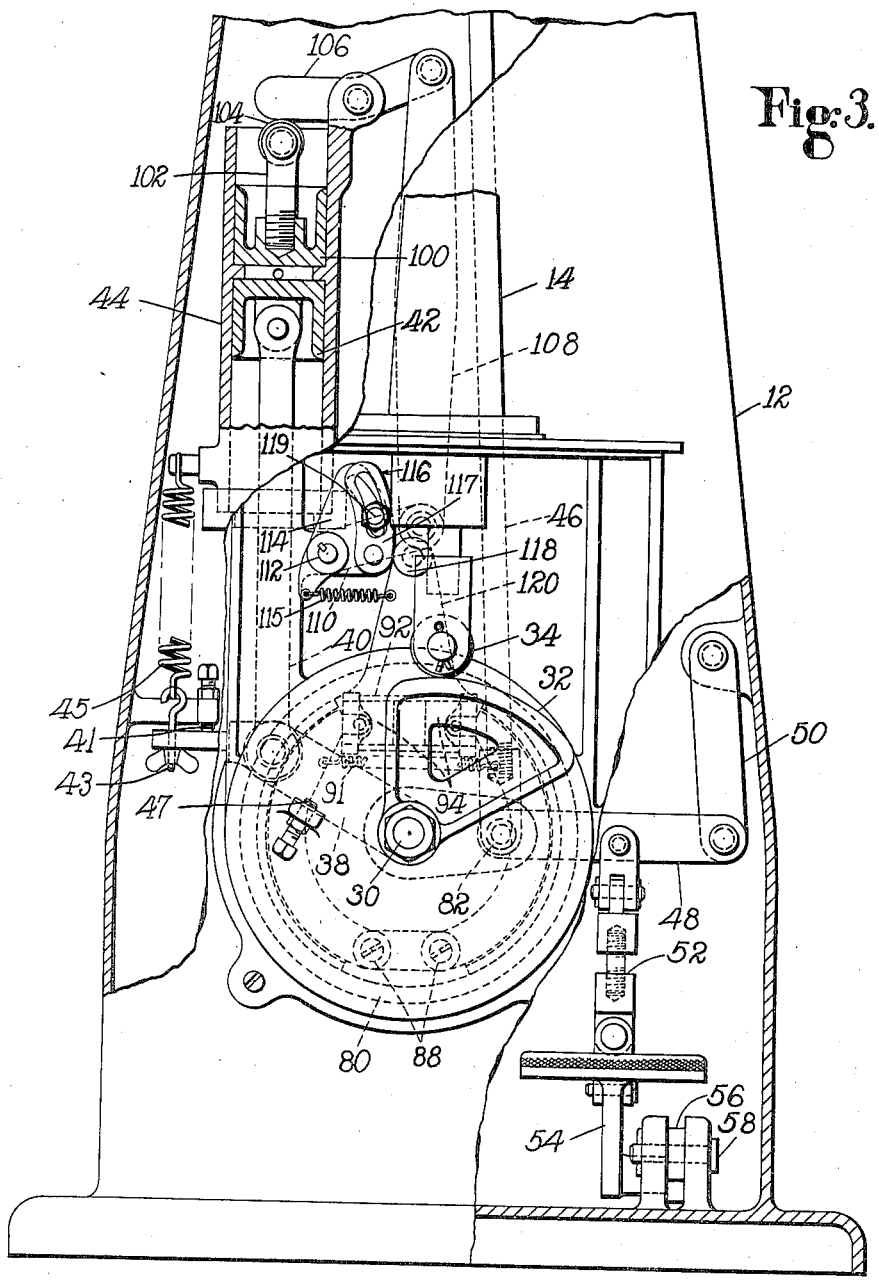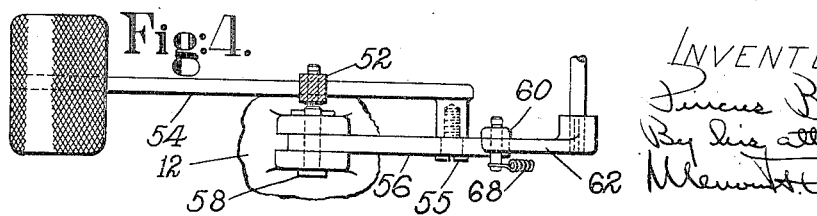

Patented Jan. 2, 1940

2,185,426

UNITED STATES PATENT OFFICE 2,185,426

FASTENING-INSERTING MACHINE

Pincus Brauner, Haverhill, Mass., assignor to United Shoe Machinery Corporation, Borough of Flemington, N. J., a corporation of New Jersey Application November 7, 1938, Serial No. 239,238

26 Claims. (Cl. 1—32)

This invention relates to apparatus by which such fastenings as nails are driven to secure together work-parts. A field in which the invention is of particular utility is that of attaching heels to shoes.

The invention provides as one of its objects, a compact and efficient system for the actuation of the operating mechanisms of a fastening-inserting machine, such system being under the control of convenient and reliable means. In achieving this object, I combine with work-pressing mechanism, as a shoe-supporting jack and a heel-engaging member, and with fastening-inserting mechanism co-operating with the pressing mechanism and which may consist of nail-drivers, fluid-pressure mechanism arranged to impart movement to both of these mechanisms, a treadle or other member for actuation by the operator, and a valve, preferably rotatable, movable by the member to control the action of the fluid-pressure mechanism. In the illustrated embodiment of the invention, the movement of the operator-actuated member first applies preliminary pressure to the work and thereafter moves the valve to cause the fluid-pressure mechanism to effect final pressure by the work-pressing mechanism and the operation of the inserting mechanism. A single act on the part of the operator thus prepares the work for the power-operation of the machine upon it and then, as a result of the actuation of the valve, completes such power-operation. The fluid-pressure mechanism may include a unitary cylinder, with oppositely movable pistons connected to the work-pressing mechanism and to the inserting mechanism, so that when pressure is admitted to the cylinder by the valve, the pistons respectively transmit power for the clamping of the work and for the insertion of the fastenings. Each of the pistons may effect the movement of a cam to apply the power to one of the two mechanisms. Means is provided for varying the force exerted by one of the operating mechanisms, as that for pressing the work. For this purpose, the cam may be adjusted to alter its operating surface. The treadle, or like operator-actuated member, may have a shifting fulcrum, movement about one fulcrum producing initial relative movement between the work-clamping members, while movement about another fulcrum actuates the valve.

Another object of the invention is to associate with the relatively movable work-support and co-operating pressure member of a fastening-inserting machine, a simple, positive and durable connecting device, which will hold such elements against their relative movement and which will transmit movement to them, the connecting effect remaining unchanged over long periods of use. To this end, I employ rotatable members, to one of which the relative movement between the support and pressure member is communicated, this connecting member being clutched to another. It is the pressure member which preferably is moved, and this causes the rotation of one of the connecting members, which is in the form of a clutch-section. With this, a second connecting member or clutch-section co-operates, and there is means, as under the influence of fluid pressure, for locking the two sections together. This arrangement may, for example, be utilized to hold preliminary pressure upon jacked work. Then, rotation of the second section may cause the application of the final pressure to said work. This, as already indicated, may be by fluid-pressure mechanism. The specific connecting means which I have chosen to illustrate includes a rotatable drum; a co-operating rotatable disk, upon which clutch-arms are pivoted, and a fluid-pressure cylinder mounted upon the disk and containing pistons connected to the arms. A fluid-pressure cylinder acting through a piston and cam turns the disk.

In the accompanying drawings is shown one of the many forms which this invention may assume;

Fig. 1 being a broken side elevation of my improved machine;

Fig. 2, a detail in rear elevation of the carrier-disk, with the clutch members and their actuating cylinder;

Fig. 3, an enlarged front elevation of the lower portion of the machine;

Fig. 4, a broken plan view of the treadle mechanism;

Fig. 5, an enlarged rear elevation of the lower portion of the machine, and

Fig. 6, an enlarged transverse section through the pressure-controlling valve.

Mounted upon a bracket 10 projecting from the front of a frame-column 12 is a jack 14, having its top arranged to receive the counter-portion of a shoe and support it with a heel upon its heel-seat for the attaching operation. Guided for vertical movement in the jack is a reciprocatory plunger 18, normally lowered by a surrounding expansion-spring 19, this plunger acting at its upper extremity upon a set of drivers 20, movable in passages in the jack-top. Nails carried points up upon these drivers will be inserted in the jacked work upon the elevation of the plunger. To clamp the heel and shoe upon the jack to resist the displacing force of the nails being driven, there is a pressure-head 22 carrying an abutment 24 for engagement with the tread-surface of the heel and an abutment 26 for contact with the rear and lateral surfaces. The head is secured to a slide 28 guided for vertical movement at the front of the frame, so the pressure-abutments may be raised to permit the application of the work to the jack or lowered to clamp it for the attachment of the heel.

Arranged to oscillate in bearings at the front of the frame near the bottom is a short, horizontal shaft 30. Secured to the forward extremity of this shaft is a cam-sector 32 against which a roll 34, rotatable at the bottom of the plunger 18, is urged by the spring 19. The rear extremity of the shaft 30 has fast upon it an arm 38, which is joined by a link 40 to a piston 42 movable in a vertical cylinder 44. A spring 45, connecting the arm 38 to a relatively fixed point, elevates the piston 42 and holds the cam 32 in its normal position. An adjustable stop 41 for the arm limits its travel under the influence of the spring, the tension of which may be altered by a screw 43 to which one end is joined. The application of pressure to the cylinder for the actuation of the cam through an angle determined by an adjustable stop 47, and the consequent operation of the plunger and its drivers, will be described later.

Depending from the pressure-slide 28 is a link 46 connected at its lower extremity to a lever 48 fulcrumed upon a link 50 pivoted within the frame. A link 52, adjustable as to length, unites the lever 48 to a treadle 54. At the rear, the treadle is pivoted at 55 to a lever 56 fulcrumed at 58 at the bottom of the frame (Figs. 1 and 4) and united by a link 60 to an arm 62, which is fixed to a conical valve-plug 64 arranged to turn in a casing 66 mounted at the rear of the treadle. A spring 68, joining the arm 62 to a fixed point, normally holds the rear extremity of the lever 56 depressed against an adjustable stop 69 and the valve 64 in a definite angular position. A spring 72 draws down one end of a lever 74 fulcrumed at the top of the frame, the opposite end of which lever is united at 76 to the slide 28, elevating this and the treadle 54. Depression of the treadle will, through the described connections, lower the head 22 to apply preliminary pressure to a shoe and heel upon the jack 14 and will rotate the valve. The extent of this valve-movement is determined by an adjustable treadle-stop 79.

Mounted to turn outside the shaft 30 is the hub 78 of a cylindrical casing or drum 80, furnishing one section of a clutch. Turning with this drum is a crank-pin 82, which also forms the connecting point of the link 46 from the pressure-slide to its actuating lever 48. At the forward side of the drum is a second clutch-section or disk 84, the hub 86 of which turns upon a portion of the frame in which the shaft 30 is journaled, this hub furnishing a bearing for the hub of the drum 80. Upon the inner face of the disk are pivoted at 88, 88, two segmental arms 90, 90 (Fig. 2). These are normally drawn inwardly by a spring 91 connecting them, but may be forced out into engagement with the interior of the drum, co-operating therewith as clutch-shoes to secure the disk to it. To effect the expansion of the arms against the drum, the disk carries a cylinder 92 in which move opposite pistons 94, 94, respectively articulated to the arms at the ends opposite their pivots. The application of pressure to the cylinder 92 is controlled by the valve 64. When it occurs, the arms are locked to the drum, the two clutch-sections being thus connected to hold upon the jacked work preliminary pressure, which has been applied by the operator through the treadle 54.

For the application of final pressure to hold the heel firmly upon the heel-seat of the jacked shoe for the insertion of the attaching nails by the drivers 20, the upper portion of the cylinder 44, or that opposite the piston 42, contains a piston 100, from which projects upwardly a rod 102 carrying a rotatable roll 104. Fulcrumed upon the cylinder is a lever 106, one arm of which bears upon the roll, while the other arm is united by a link 108 to an arm 110 secured to a horizontal spindle 112 rotatable in the frame. To the opposite extremity of the spindle is fixed a cam-arm 114, against a surface 116 upon which bears a roll 118 rotatable upon an extension 120 from the clutch-disk 84. A spring 115 joining the disk-extension 120 to a downward extension of the arm 114, holds the roll 118 in engagement with the surface 116 and the piston 100 lowered. When pressure is applied within the cylinder 44, the elevation of the piston 100 will swing the cam-arm 114 in a counterclockwise direction, as viewed in Fig. 5, and by its action upon the roll 118 turns the clutch-disk 84 in the same direction. This rotates the drum 80, locked to the disk by the arms 90 under the influence of pressure in the cylinder 92, and causes the application to the jacked work of clamping pressure. The force exerted may be varied by adjusting the normal position of the surface 116. Upon the main section 114 of the cam-arm, a secondary section 117 is pivoted. This is variably fixed as to its angular relation on the main section by a slot-and-screw connection 119. The extent to which the disk 84 and the locked drum 80 are turned and the leverage exerted is correspondingly altered.

The force to be exerted through the cylinders 44 and 92 under the control of the valve 64 may be supplied by a fluid, preferably in the form of a liquid, such as oil, circulated under pressure by a pump 121 from a tank 122. This pressure-system is shown diagrammatically in Fig. 1 of the drawings. The pump, preferably of the rotary type and driven through a power-shaft 124, draws the liquid from the tank through a pipe 126 and delivers it by a pipe 128 to the valve-casing 66. From the casing, a pipe 130 leads to the center of the cylinder 92, while a pipe 132 connects to the center of the cylinder 44. The exhaust is returned to the tank from the casing 66 through a pipe 134. Normally, as will be seen in Fig. 6, the valve 64 closes the supply-pipe 128 and connects both the pipes 130 and 132 of the cylinders 92 and 44, respectively, to the exhaust-pipe 134. This releases the pistons in these cylinders and permits the drivers 20 to be lowered by the spring 19. The drum 80 is freed by the clutch-arms 90, so the pressure-head 28 may be raised from the jack 14 by the spring 72. Then, as the valve is rotated by depression of the treadle 54, pressure is first supplied to the cylinder 92 to lock the head 28 in the position to which it has been carried by the treadle, and immediately thereafter, the cylinder 44 receives pressure to apply the clamping force to the work through the piston 100 and to act upon the piston 42 to elevate the drivers 20 and insert the nails. When the treadle is released, and the valve 64 returned to its initial position by the spring 68, the connection of the pipe 132, and therefore the cylinder 44, is shifted from the supply-pipe 128 to the exhaust-pipe 134, so final pressure will be removed from the work, and the drivers lowered. Then, the pipe 130 of the cylinder 92 will be united to the exhaust-pipe to release the lock upon the pressure-head applied by the clutch mechanism. In the normal position of the valve, the pressure created by the pump may be by-passed back to the exhaust side through a pipe 140, in which is a relief-valve 142.

In the use of the machine, the operator supplies nails N to the jack-passages in which the drivers 20 reciprocate, jacks a shoe S and places upon its heel-seat a heel H. Depressing the treadle 54 about its pivotal connection at 55 to the lever 56 as a fulcrum, he brings the abutments 24 and 26 of the pressure-head 22 into engagement with the heel. At this time, if necessary, the work-portions may be adjusted upon the jack. Preliminary pressure having thus been applied, a further depression of the treadle transfers its fulcrum to the link 52, held against downward movement by the contact of the abutments with the heel. The spring 68, which has held the rear extremity of the lever 56 against upward movement, now yields, so said lever swings up about its fulcrum 58, raising the link 60 and turning the valve 64 clockwise, as viewed in Fig. 1. In the movement of the valve, the pipe 128 delivers pressure from the pump 121, which is at once put in communication with the pipe 130. This acts upon the pistons 94, 94 in the cylinder 92, forcing these apart to urge the clutch-arms 96, 96 against the interior of the drum 80. Since the disk 84 is held against rotation by engagement with the cam-arm 114, 117 of the roll 118, the pressure-head 22 is thereby locked against upward movement in the position to which it has been lowered by the treadle. In the continuing rotation of the valve, the supply-pipe 128 is joined to the pipe 132 of the cylinder 44. This causes the piston 100 to be elevated and, through the intermediate connections, swing the cam-arm against the roll 118, rotating the disk 84 anti-clockwise (Fig. 5). As the drum 80 is clutched to the disk by the arms 96, as just described, this drum is similarly rotated and, through the rod 46, lowers the head 22 to place additional and final pressure upon the work. The fluid admitted to the cylinder 44 also forces down the piston 42, this movement being delayed by the degree of tension applied to the spring 45. This turns the shaft 30 of the cam 32, elevating the plunger 18 in the jack 14 and causing the drivers 20 to insert the nails through the heel-seat of the clamped shoe into the heel. This travel of the drivers may include some lost motion before the points of the nails reach the insole. The operator releases the treadle, the spring 68 turning the valve 64 anticlockwise (Fig. 1), cutting off the fluid-supply pipe 128 from the pipe 130 of cylinder 92 and the pipe 132 of cylinder 44 and joining these to the exhaust-pipe 134. This permits the spring 19 to lower the drivers, the spring 45 to restore the driver-cam 32 to its initial position, and the spring 72 to raise the abutments 24 and 26 from the work and to lift the treadle. Upon the removal of the heeled shoe from the jack, the machine is ready for the succeeding operation. It will be seen that the clutch mechanism for holding preliminary pressure and applying final pressure is extremely simple, with limited contact-surfaces which are readily kept in proper operating condition, yet give reliable engagement under the influence of efficient actuating means.

Having described my invention, what I claim as new and desire to secure by Letters Patent of the United States is:

1. In a fastening-inserting machine, movable work-pressing mechanism, mechanism movable in co-operation therewith to engage fastenings and insert them in the work, fluid-pressure mechanism arranged to impart movement to both the work-pressing mechanism and the inserting mechanism, a member for actuation by the operator, and a valve movable by said member to control the action of the fluid-pressure mechanism.

2. In a fastening-inserting machine, movable work-pressing mechanism, fastening-inserting mechanism movable in co-operation therewith, fluid-pressure mechanism arranged to impart movement to both the work-pressing mechanism and the inserting mechanism, a member for actuation by the operator to apply preliminary pressure to the work, and a valve movable by said member to produce through the fluid-pressure mechanism the application of final pressure by the work-pressing mechanism and the operation of the inserting mechanism.

3. In a heel-attaching machine, a shoe-supporting jack, fastening-drivers movable therein, a heel-engaging member movable toward and from the jack, a treadle by which there may be imparted to the heel-engaging member a portion of its movement, fluid-pressure mechanism arranged to further actuate the heel-engaging member and to also actuate the drivers, and a valve operable by the treadle to control the application of fluid pressure to said mechanism.

4. In a heel-attaching machine, a shoe-supporting jack, fastening-drivers movable therein, a heel-engaging member movable toward and from the jack, a treadle having a fulcrum about which it may move to apply pressure to the work through the heel-engaging member and a second fulcrum about which it may move, fluid-pressure mechanism arranged to actuate the heel-engaging member and the drivers, and a valve rotatable by the movement of the treadle about its second fulcrum to control the application of fluid pressure to said mechanism.

5. In a fastening-inserting machine, movable work-pressing mechanism, fastening-inserting mechanism movable in co-operation therewith, a cylinder, pistons movable oppositely in the cylinder and connected respectively to the work-pressing mechanism and to the inserting mechanism, and means for supplying fluid pressure to the cylinder between the pistons.

6. In a fastening-inserting machine, movable work-pressing mechanism, fastening-inserting mechanism movable in co-operation therewith, a cylinder, pistons movable oppositely in the cylinder and connected respectively to the work-pressing mechanism and to the inserting mechanism, means for supplying fluid pressure to the cylinder between the pistons, and means arranged to vary the force applied by one of the pistons.

7. In a fastening-inserting machine, a movable work-pressing member, fastening-inserting mechanism movable in co-operation therewith, a cylinder, pistons movable oppositely in the cylinder and connected to the work-pressing member and to the inserting mechanism, means for supplying fluid pressure to the cylinder between the pistons, and a member for actuation by the operator to move the work-pressing member and to control the supply of pressure to the cylinder.

8. In a fastening-inserting machine, a work-support, a pressure member co-operating therewith, said support and member being initially relatively movable by the operator, fluid-pressure means for imparting additional relative movement to the support and member, a valve for controlling the fluid pressure, and a lever having a shifting fulcrum, said lever being movable about one fulcrum to produce the initial relative movement and about another fulcrum to actuate the valve.

9. In a heel-attaching machine, a shoe-supporting jack, fastening-drivers movable therein, a heel-engaging member movable toward and from the jack, a cylinder, pistons movable oppositely in the cylinder and acting respectively upon the drivers and the heel-engaging member, a treadle by which the heel-engaging member may be moved, and a valve operable by movement of the treadle to control the supply of fluid pressure to the cylinder between the pistons.

10. In a fastening-inserting machine, movable work-pressing mechanism, fastening-inserting mechanism movable in co-operation therewith, fluid-pressure mechanism, and cams actuated by the fluid-pressure mechanism to impart movement respectively to the work-pressing mechanism and to the inserting mechanism.

11. In a fastening-inserting machine, movable work-pressing mechanism, fastening-inserting mechanism movable in co-operation therewith, fluid-pressure mechanism, a cam actuated by the fluid-pressure mechanism to impart movement to the work-pressing mechanism, and means arranged to vary the operating surface of the cam.

12. In a fastening-inserting machine, movable work-pressing mechanism, fastening-inserting mechanism movable in co-operation therewith, fluid-pressure mechanism, a cam actuated by the fluid-pressure mechanism and formed in relatively movable sections, one of which operates the work-pressing mechanism, and means arranged to secure such operating section in different positions upon the companion section.

13. In a fastening-inserting machine, movable work-pressing mechanism, fastening-inserting mechanism movable in co-operation therewith, fluid-pressure mechanism, cams actuated by the fluid-pressure mechanism to impart movement respectively to the work-pressing mechanism and to the inserting mechanism, and means arranged to vary the operating surface of one of the cams.

14. In a fastening-inserting machine, movable work-pressing mechanism, fastening-inserting mechanism movable in co-operation therewith, a cylinder, two pistons movable oppositely in the cylinder, and two cams actuated by the respective pistons to impart movement to the work-pressing mechanism and to the inserting mechanism.

15. In a fastening-inserting machine, a work-support, a pressure member co-operating therewith, means for moving the support and pressure member relatively, a rotatable connecting member to which such movement is communicated, a second rotatable connecting member co-operating with the first, and means for clutching the connecting members together to hold the support and pressure member against relative movement.

16. In a fastening-inserting machine, a work-support, a pressure member co-operating therewith, means for moving the support and pressure member relatively, a rotatable connecting member to which such movement is communicated, a second rotatable connecting member co-operating with the first, means for rotating the second connecting member, and means for coupling the two connecting members to turn together.

17. In a fastening-inserting machine, a work-support, a pressure member movable in co-operation therewith, a clutch-section rotatable in the movement of the pressure member, a rotatable clutch-section co-operating therewith, means for rotating the second clutch-section, and means for clutching the two sections together.

18. In a fastening-inserting machine, a work-support, a pressure member co-operating therewith, means for moving the support and pressure member relatively, a connecting member to which such movement is communicated, a second connecting member co-operating with the first, fluid-pressure means for moving the second connecting member, and fluid-pressure means for compelling the two connecting sections to move together.

19. In a fastening-inserting machine, a work-support, a pressure member co-operating therewith, means for moving the support and pressure member relatively, a rotatable connecting member to which such movement is communicated, a second rotatable connecting member co-operating with the first, means for rotating the second connecting member, and fluid-pressure means for compelling the two connecting members to turn together.

20. In a fastening-inserting machine, a work-support, a pressure member co-operating therewith, means for moving the support and pressure member relatively, a rotatable connecting member to which such movement is communicated, a second rotatable connecting member co-operating with the first, fluid-pressure means for rotating the second connecting member, and means for compelling the two connecting members to turn together.

21. In a heel-attaching machine, a jack, drivers movable therein, a pressure-head movable toward and from the jack, two rotatable clutch members, one of which is connected to the head, means for controlling the rotation of the other member, and means for clutching the members together.

22. In a heel-attaching machine, a jack, drivers movable therein, a pressure-head movable toward and from the jack, two rotatable clutch members, one of which is connected to the head, means for controlling the rotation of the other member, and fluid-pressure means mounted upon one of the members for clutching the members together.

23. In a heel-attaching machine, a jack, drivers movable therein, a pressure-head movable toward and from the jack, two rotatable clutch members, one of which is connected to the head, fluid-pressure means for rotating the other member, and fluid-pressure means for clutching said members together.

24. In a heel-attaching machine, a jack, drivers movable therein, a pressure-head movable toward and from the jack, a drum rotatable in the movement of the pressure-head, a rotatable disk co-operating with the drum, clutch-arms pivoted upon the disk for engagement with the drum, a fluid-pressure-cylinder mounted upon the disk, and pistons movable in the cylinder and connected to the arms.

25. In a heel-attaching machine, a jack, drivers movable therein, a pressure-head movable toward and from the jack, a drum rotatable in the movement of the pressure-head, a rotatable disk co-operating with the drum, clutch-arms pivoted upon the disk for engagement with the drum, a fluid-pressure-cylinder mounted upon the disk, pistons movable in the cylinder and connected to the arms, and means for rotating the disk.

26. In a heel-attaching machine, a jack, drivers movable therein, a pressure-head movable toward and from the jack, a drum rotatable in the movement of the pressure-head, a rotatable disk co-operating with the drum, clutch-arms pivoted upon the disk for engagement with the drum, a fluid-pressure-cylinder mounted upon the disk, pistons movable in the cylinder and connected to the arms, a cam acting upon the disk, a fluid-pressure-cylinder, and a piston movable in the cylinder and connected to the cam.

PINCUS BRAUNER.